May 3, 1955 C. SCHRON 2,707,419
MEANS FOR LOCATING FIXTURE PLATES WITH RESPECT
TO THE BEDS OR PLATENS OF MACHINE TOOLS
Filed Aug. 19, 1953 2 Sheets-Sheet 1

INVENTOR.
CHRISTY SCHRON
BY
William Isler
ATTORNEY.

May 3, 1955
C. SCHRON
2,707,419
MEANS FOR LOCATING FIXTURE PLATES WITH RESPECT
TO THE BEDS OR PLATENS OF MACHINE TOOLS
Filed Aug. 19, 1953
2 Sheets-Sheet 2
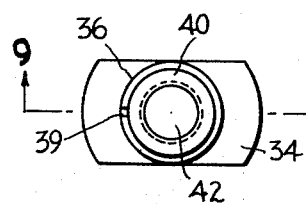
FIG. 5
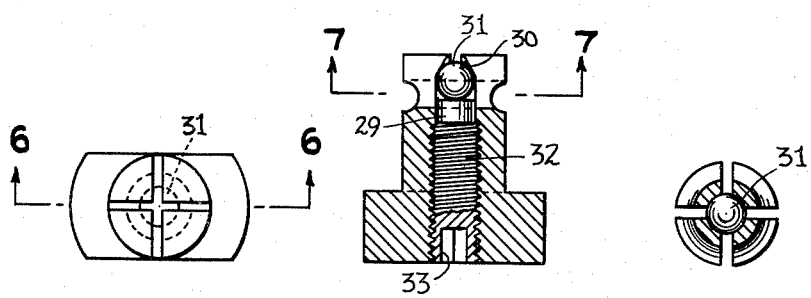
FIG. 6     FIG. 7
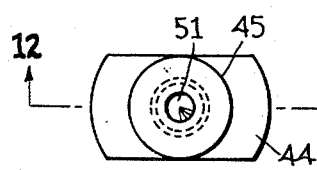
FIG. 8
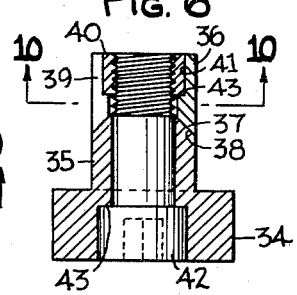
FIG. 9
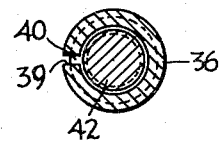
FIG. 10
FIG. 11
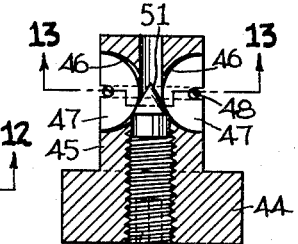
FIG. 12
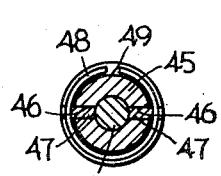
FIG. 13
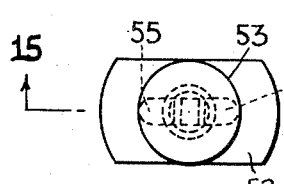
FIG. 14
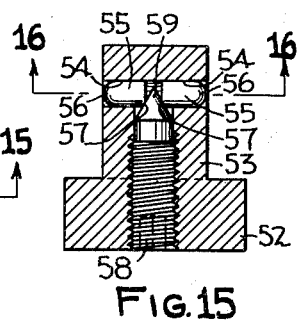
FIG. 15
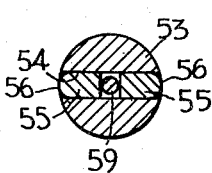
FIG. 16
INVENTOR.
CHRISTY SCHRON
BY
William Isler
ATTORNEY.

United States Patent Office 2,707,419
Patented May 3, 1955

2,707,419

MEANS FOR LOCATING FIXTURE PLATES WITH RESPECT TO THE BEDS OR PLATENS OF MACHINE TOOLS

Christy Schron, Euclid, Ohio, assignor to Jergens Tool Specialty Company, Cleveland, Ohio, a corporation of Ohio Application August 19, 1953, Serial No. 375,223

3 Claims. (Cl. 90—59)

This invention relates, in general, to means or locating fixture plates with respect to the beds or platens of machine tools.

In the milling or machining of parts on machine tools, such as a milling machine, it is customary to provide a fixture plate or base plate having grooves or slots in the lower surface of the plate, and to secure to the plate in such grooves or slots fixture keys which project downwardly from the plate, and into a T-slot in the table, bed or platen of the machine tool, the keys being movable in such T-slot, for the purpose of adjusting the location of the fixture plate with reference to the bed of the machine tool. In some cases, the fixture keys are movable in plain grooves or slots in the lower surface of the fixture plate.

The fixture plate is usually clamped to the bed or platen of the machine tool, and may be provided on its upper surface with pins, abutments or other means for locating the work or part to be milled or otherwise machined on the machine tool.

The milling or forming of the grooves or slots in the lower surface of the fixture plate has always presented an extremely difficult problem, for several reasons. In the first place, the actual milling or forming of the slots requires considerable labor and time. In the second place, and most important from the standpoint of the manufacturer, considerable difficulty has always been experienced in properly milling the slots with the required degree of accuracy with reference or relation to the proper location of the work which is clamped to or supported on the fixture plate. As a matter of fact, it is extremely difficult to machine or mill even two spaced slots or grooves in exact alignment or relation to each other. Even a slight deviation from absolute accuracy in the milling of such slots in the lower surface of the fixture plate results in a magnification of errors, insofar as the machining of the work which is clamped to or supported on the fixture plate is concerned. In precision work, even minute misalignment between the slots and the work results in rejection of the work which is being machined.

For different widths of slots or grooves on the bed of the machine tool, it is necessary to provide different widths or sizes of fixture keys, and this, in turn, necessitates the use of fixture plates having milled grooves or slots of a width corresponding to the grooves on the bed. This requires that a large assortment of fixture plates be kept in stock at all times.

I have discovered, however, that by using fixture plates having circular openings extending into the plate, instead of milled grooves or slots in the lower surface of the plate, and utilizing fixture keys having circular shanks secured in such openings, that I can maintain an extraordinary degree of accuracy, mainly because it is much easier to bore holes in a fixture plate and have them accurately located with respect to each other, and with respect to other locating holes or marks on the fixture plate, than where slots or grooves are milled in the fixture plate. This accuracy is due largely to the fact that such holes may be bored on a jig borer, a machine drills and locates holes far more accurately than it is possible to machine grooves or slots in proper relation to each other. Moreover, the holes can be drilled and bored into the plate far more accurately and with much less labor than is required to locate grooves or slots with reference to holes or marks on the upper surface of the plate. Also, by utilizing round holes drilled or bored in the fixture plate, fixture keys having circular shanks can be utilized, in which the shanks snugly fit in the holes and are free to turn in the holes, thus greatly simplifying and facilitating the proper mounting of the fixture plate on the bed. Furthermore, fixture keys, having shanks of the same size, but heads of different widths, may be utilized, so that the same fixture plate may be utilized for various widths of slots in the bed or platen of the machine.

The present invention, therefore, is concerned primarily with a novel combination of elements for use in machine tool work, through which an extraordinary degree of accuracy is obtained, namely, the combination of a fixture plate having circular openings therein, and fixture keys having circular shanks disposed in said openings, and heads of various polygonal shapes centrally disposed relatively to the shanks and depending from the fixture plate and adapted for movement in the T-slots or grooves of the bed or platen of machine tools, such as milling machines.

Another object of the invention is the provision of a novel combination of a fixture plate and fixture keys, in which the use of T-slots and other forms of slots or grooves for the keys is eliminated, and in which the keys are rigidly secured to the plate.

A further object of the invention is to provide a fixture key of novel construction, having means incorporated therein for rigidly securing the key to a fixture plate.

A still further object of the invention is to provide a fixture or base plate which is devoid of the slots or grooves which are conventionally used for the reception of the fixture keys.

Other objects and advantages of the invention will be apparent during the course of the following description.

In the accompanying drawings, forming a part of this specification, and in which like numerals are employed to designate like parts throughout the same:

Fig. 5 is a plan view of a modified form of fixture key;

Fig. 6 is a cross-sectional view, taken on the line 6—6 of Fig. 5;

Fig. 7 is a cross-sectional view, taken on the line 7—7 of Fig. 6;

Fig. 8 is a view similar to Fig. 5, but showing another modification of the fixture key;

Fig. 9 is a cross-sectional view, taken on the line 9—9 of Fig. 8;

Fig. 10 is a cross-sectional view, taken on the line 10—10 of Fig. 9;

Fig. 11 is a view similar to Fig. 8, but showing another modification of the fixture key;

Fig. 12 is a cross-sectional view, taken on the line 12—12 of Fig. 11;

Fig. 13 is a cross-sectional view, taken on the line 13—13 of Fig. 12;

Fig. 14 is a plan view of still another modification of the fixture key;

Fig. 15 is a cross-sectional view, taken on the line 15—15 of Fig. 14, and

Fig. 16 is a cross-sectional view, taken on the line 16—16 of Fig. 15.

Figure 1:
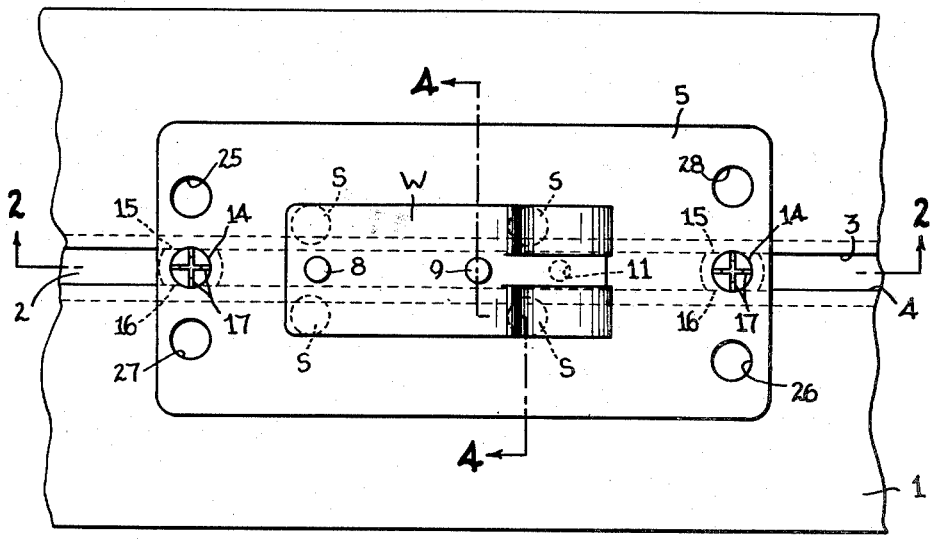
Fig. 1 is a fragmentary top plan view, showing an arrangement of parts utilizing the principal features of the invention.
Figure 2:
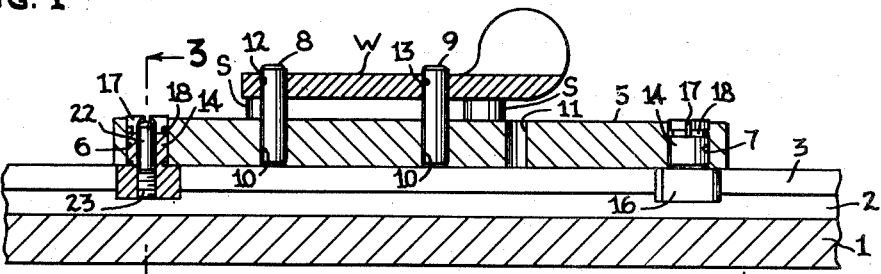
Fig. 2 is a longitudinal cross-sectional view, taken on the line 2—2 of Fig. 1.
Figure 4:
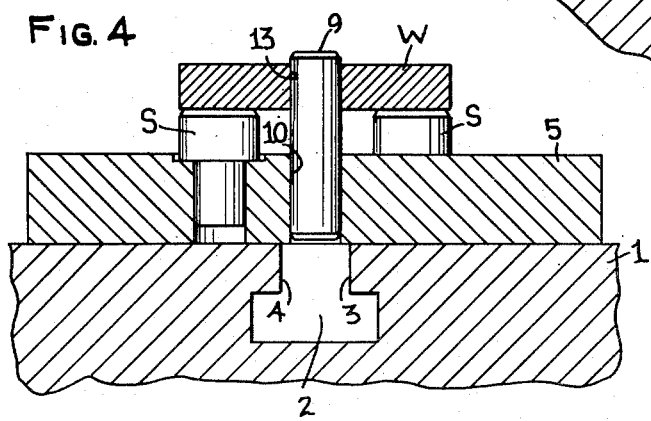
Fig. 4 is a fragmentary transverse cross-sectional view, taken on the line 4—4 of Fig. 1.
Figure 3:
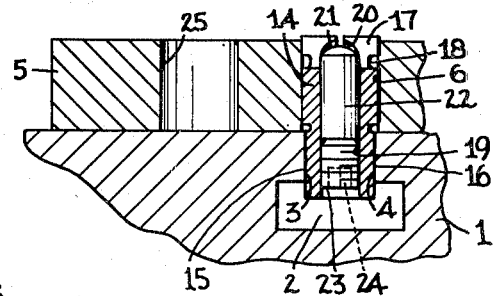
Fig. 3 is a fragmentary transverse cross-sectional view, taken on the line 3—3 of Fig. 2.

Referring more particularly to Figs. 1 to 4 inclusive of the drawings, reference numeral 1 represents a fragment of the bed or platen of a machine tool, such, for example, as a milling machine, and having a T-slot or groove 2 in its upper surface, the upper portion of said slot being of uniform width, defined by vertical parallel walls 3 and 4.

Mounted on the bed or platen 1 is a rectangular fixture or base plate 5, which is adapted, after being properly located with respect to the bed or platen 1, to be clamped to the bed or platen by any suitable conventional clamping means, not shown.

For the purpose of facilitating movement of the fixture plate with respect to the bed or platen 1, the fixture plate is provided, at longitudinally spaced points, along the central axis thereof, with circular openings 6 and 7, which extend into the plate, and are adapted for the reception of the shanks of fixture keys, to be presently described.

The fixture plate, in this case, is provided with a pair of spaced locating pins 8 and 9, secured, as by a press fit, in openings 10 in the plate, a small locator opening 11 being also provided in the plate in advance of the locating pin 9. The plate is further provided with four pins S, which provide a support for a piece of work W, which is to be machined. The piece of work W is provided with spaced openings 12 and 13, which are adapted to receive the pins 8 and 9 respectively, for the purpose of properly locating the work piece W on the fixture plate.

Each of the fixture keys consists of a circular shank 14, disposed within the opening 6 or 7 in the fixture plate, and a head, centrally located with respect to the shank, and having accurately ground parallel sides 15 and 16 spaced apart a distance corresponding to the distance between the vertical parallel walls 3 and 4 in the bed or platen 1, so as to be slidable in the slot or groove 2.

The end of the shank is slotted, as at 17, and, in order to facilitate the spreading apart of the portions of the shank intermediate the slots 17, a portion of the shank is removed to provide an annular recess 18. The key is provided with an axial opening 19, which is tapped to the depth indicated, and the lower end of this opening is tapered or constricted to provide a conical surface 20, against which the tapered lower end 21 of a pin 22 is seated. The pin 22 is maintained in position by means of a screw 23 which is threadedly secured within the tapped opening 19 in the key, the screw having a recess 24 of hexagonal cross-section in its head, for the reception of a wrench whereby the screw may be rotated.

Prior to insertion of the shank of the key in the opening 6 or 7, the screw 23 is turned sufficiently to relieve pressure on the pin 22. This permits the shank of the key to be inserted into the opening 6 or 7 with a slide fit. After the shank of the key has been inserted in the opening 6 or 7, the screw 23 is turned, so as to cause the pin 22 to exert pressure against the surface 20, thereby causing the portions of the shank intermediate the slots 17 to spread apart, and to frictionally engage the walls of the openings 6 or 7 with sufficient pressure to resist any tendency of the fixture key to be displaced from the fixture plate.

As previously stated, the spreading apart of the portions of the shank intermediate the slots 17 is facilitated by virtue of the provision of the annular recess 18. By the same token, the increased resiliency of these portions of the shank, resulting from the provision of such recess, enables these portions to resume their initial positions when the pressure of the pin 22 on the surface 20 is relieved, thereby facilitating removal of the key from the fixture plate.

It may be noted at this point, that the shank of the key, even with the pressure of the expanding means relieved, has a slide fit in the hole, which insures accurate centering and location of the pin. The expansion of the shank is merely to insure against the pin sliding out of the hole, since the key is used in an inverted position.

It will also be noted that the fixture plate is devoid of T-slots or other slots or grooves in its undersurface for the reception of the fixture keys, and that instead, it is provided only with the easily-drilled circular openings 6 and 7 for the keys. This elimination of slots materially lowers the cost of the fixture plate and aids in preserving the strength of the plate. The provision of circular openings extending into the plate and the utilization of fixture keys having circular shanks secured in such openings enables an extraordinary degree of accuracy to be maintained, primarily because it is much easier to drill and bore holes in the fixture plate and locate them accurately with respect to each other, and with respect to other locating holes or marks on the fixture plate, than where slots or grooves are milled in the fixture plate. The holes 6 and 7 may be drilled and bored on a jig borer at the same time that the holes 10 and 11 are drilled and bored, and can be drilled into the fixture plate far more accurately and with much less labor than where it is necessary to locate grooves with reference to holes or marks on the upper surface of the plate.

By utilizing round holes drilled or bored in the fixture plate, fixture keys having circular shanks can be utilized, in which the shanks snugly fit in the holes and are free to turn in the holes, thus greatly simplifying and facilitating the proper mounting of the fixture plate on the bed. For example, one of the keys may be placed in the slot of the bed, and the plate moved laterally so as to properly align the flat face of the head with the work supporting location, due to the relative turning movement between the plate and key. If the second key is not in proper aligned position, so as to fit the slot in the machine bed, the plate may be lifted away from the bed so as to disengage the first head after which the second key head is placed in the slot of the bed, and the plate rotated laterally about the shank of this second key, until the first key registers with the slot, at which time it will drop into the same, and the plate will be properly aligned. Such operation is not possible in cases where the key is not free to turn in the fixture plate.

Moreover, fixture keys having shanks of the same size, but heads of different widths, may be utilized, so that the same fixture plate may be utilized for various widths of slots in the bed or platen of a machine tool.

The fixture plate may also be provided with additional pairs or sets of circular openings 25—26 and 27—28, which are adapted to receive the shanks of fixture keys similar to those described. These pairs of openings facilitate setting of the fixture plate at angles to the slot or groove in the platen, as when machine parts having angular slots, generally termed "rights" or "lefts," are to be machined. These openings can be located or laid out accurately with respect to the openings 6 or 7, or with respect to the openings 10 or 11, with the same facility and in the same way that the openings 6 and 7 are drilled. By utilizing such sets of openings for angular placement of the fixture plate on the bed or platen of the machine, the necessity for angularly extending slots or grooves in the lower surface of the fixture plate is obviated. The milling of such angularly extending slots or grooves in the lower surface of a fixture plate, for the reception of fixture keys has always been an extremely difficult, tedious and time consuming and costly operation, and under the best conditions, accuracy of placement of the grooves cannot be assured.

Various other forms or modifications of fixture keys may be used, instead of that shown in Figs. 1 to 4.

In that form of the fixture key shown in Figs. 5, 6 and 7, the key is provided, with an axial opening 29, which is tapped to the depth indicated, and the upper end of this opening is tapered or constricted to provide a conical surface 30, against which a ball 31 is seated. The ball 31 is maintained in position by means of a screw 32 which is threadedly secured within the tapped opening 29, in the key, the screw having a recess 33 of hexagonal cross-section in its upper end.

In that form of the fixture key shown in Figs. 8, 9 and 10, the key comprises a lower member consisting of a head 34, and a circular shank 35, and an upper circular member 36, which is normally of the same external diameter as that of the shank 35. The shank 35 has a frusto-conical surface 37 at its upper end, and a member 36 of the key has a correspondingly inclined frusto-conical surface 38 at its lower end, in abutment with the surface 37. The member 36 is provided with a slot 39 at one point in its circumference, whereby the member may be expanded in diameter. The key further includes a nut 40 which is disposed in a recess 41 in the top of the member 36, and a socket head cap screw 42 which extends axially through the lower key member, the member 36 and the nut 40. The screw 42 is in threaded engagement with the nut 40. The head of the cap screw 42 bears on a shoulder 43 of the lower key member.

The use of the key shown in Figs. 8, 9 and 10 will be readily apparent. When the screw 42 is turned into the nut 40, the nut 40 approaches the lower member of the key. This causes the coaction of the surfaces 37 and 38 to expand the member 36 into tight frictional engagement with the wall of the opening 6 or 7 in the fixture plate, thereby securely locking the key in the fixture plate.

In that form of the fixture key shown in Figs. 11, 12 and 13, the key comprises a head 44 and a circular shank 45. The upper portion of the shank is provided with diametrically-opposed, semi-circular recesses 46 in which Woodruff keys 47 are disposed. These keys are retained in the recesses 46 by means of a circular split spring 48, which encircles the shank, and is disposed in an annular recess 49 in the shank. The key is also provided with a socket head cap screw 50 having a conical upper end 51 which normally bears against the keys 47. When the screw 50 is turned into the fixture key, the tapered end 51 thereof forces the keys 47 radially outwardly from the shank, against the tension of the spring 48, and into tight frictional engagement with the wall of the opening 6 or 7 in the fixture plate, thereby securely locking the key in the fixture plate. Upon release of pressure against the keys 47, the spring 48 returns them to their normal position.

In that form of the fixture key shown in Figs. 14, 15 and 16, the key comprises a head 52 and a circular shank 53. The upper portion of the shank is provided with diametrically-extending recesses 54, in the opposite ends of which pins 55 are disposed for sliding movement radially of the shank. Each of the pins has a rounded outer end 56 and a bevel surface 57 at its inner end. The key further includes a socket head cap screw 58 having a conical upper end 59 which bears against the bevel surfaces 57 of the pins 55. When the screw 58 is turned into the fixture key, the tapered end 59 thereof forces the pins 55 radially outwardly from the shank, and into tight frictional engagement with the wall of the opening 6 or 7 in the fixture plate, thereby securely locking the key in the fixture plate. Upon release of pressure against the pins 55, they return to their normal position.

It will be understood that the device which has been described may be satisfactorily employed in connection with milling machines, planing machines, and other machine tools in which the work is to be clamped, gauged or otherwise held against displacement during the machining operations.

It is to be understood that the forms of my invention, herewith shown and described, are to be taken as preferred examples of the same, and that various changes in the shape, size and arrangement of parts may be resorted to, without departing from the spirit of my invention or the scope of the subjoined claims.

This application is a continuation-in-part of my copending application, Serial No. 161,755, filed May 13, 1950, now abandoned.

Having thus described my invention, I claim:

1. A fixture plate for use with a machine tool bed having a slot therein defining parallel side walls comprising a plate having means thereon on one face for locating a work piece on said plate and having spaced uniform cylindrical openings extending into said plate at right angles to said face and arranged in predetermined relationship to said locating means, removable guide keys each having an unthreaded cylindrical shank fitted in one of said openings and snugly engaging the walls of said cylindrical opening and an integral head on said shank positioned axially thereof projecting from the other face of said plate, said head including side faces parallel throughout their length slidably engaging the parallel side walls of said slot, the entire width of said head measured transversely of said parallel faces being no wider than the distance between said parallel side walls, whereby said fixture plate may be liftable as a unit away from said slot by movement perpendicular to the plane of the machine tool bed, and means for removably securing said keys in said openings.

2. A fixture plate for use with a machine tool bed having a slot therein defining parallel side walls comprising a plate having means thereon on one face for locating a work piece on said plate and having spaced uniform cylindrical openings extending completely through said plate at right angles to said face and arranged in predetermined relationship with respect to said locating means, removable guide keys each having a cylindrical shank fitted in one of said openings and snugly engaging the walls of said cylindrical opening, an annular portion of said shank being expandable to augment the fit and secure said shank in said opening and an integral head on said shank positioned axially thereof projecting from the other face of said plate, said head including side faces parallel throughout their length slidably engaging the parallel side walls of said slot, the entire width of said head measured transversely of said parallel faces being no wider than the distance between said parallel side walls, whereby said fixture plate may be liftable as a unit away from said slot by movement perpendicular to the plane of the machine tool bed, and means for expanding said annular portion of said shank for removably securing said keys in said openings.

3. A fixture plate as defined in claim 2, in which the locating means comprises pins spaced longitudinally of the plate and aligned with a pair of the key receiving openings.

References Cited in the file of this patent

UNITED STATES PATENTS

| | | |
|---|---|---|
| 2,372,716 | Evans | Apr. 3, 1945 |
| 2,472,083 | Bartholdy | June 7, 1949 |